United States Patent
Nishihara et al.

(10) Patent No.: US 7,247,678 B2
(45) Date of Patent: *Jul. 24, 2007

(54) RUBBERY POLYMER COMPOSITION

(75) Inventors: Hajime Nishihara, Yokohama (JP); Takeshi Yasui, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/455,724

(22) Filed: Jun. 6, 2003

(65) Prior Publication Data

US 2005/0004313 A1    Jan. 6, 2005

(51) Int. Cl.
*C08L 23/04* (2006.01)
*C08L 23/10* (2006.01)
*C08L 23/16* (2006.01)
*C08L 25/02* (2006.01)

(52) U.S. Cl. ............... 525/191; 525/240; 525/241

(58) Field of Classification Search ........ 525/191, 525/240, 241
See application file for complete search history.

(56) References Cited

U.S. PATENT DOCUMENTS

| | | | |
|---|---|---|---|
| 6,384,143 B1 * | 5/2002 | Nishihara et al. | 525/191 |
| 6,403,716 B1 * | 6/2002 | Nishihara | 525/191 |
| 6,458,893 B1 * | 10/2002 | Tasaka et al. | 525/222 |
| 6,800,693 B2 * | 10/2004 | Nishihara et al. | 525/191 |

* cited by examiner

*Primary Examiner*—Nathan M. Nutter
(74) *Attorney, Agent, or Firm*—Birch, Stewart, Kolasch & Birch, LLP

(57) ABSTRACT

A vulcanized rubbery polymer composition comprising a component (A) and a thermoplastic resin (B), wherein the component (A) comprises a hydrogenated copolymer (A-1), which is obtained by hydrogenating a copolymer comprising a conjugated diene monomer unit and an aromatic vinyl monomer unit and having an aromatic vinyl monomer content of not less than 5% by weight and not more than 90% by weight, and which has a crystallization peak calorie measured by a differential scan calorimetry of not more than 2 J/g, and at least one vulcanizable rubber (A-2) selected from the group consisting of a copolymer (a1) comprising an ethylene unit and an α-olefin unit of 3 to 20 carbon atoms and a hydrogenated rubber (a2) obtained from a homopolymer rubber of at least one conjugated diene monomer or a copolymer rubber comprising a conjugated diene monomer unit and an aromatic vinyl monomer unit and having an aromatic vinyl monomer content of less than 5% by weight.

10 Claims, 2 Drawing Sheets

RUBBERY POLYMER COMPOSITION

CROSS-REFERENCE TO RELATED APPLICATIONS

This application is based on Japanese Patent Application No. 2000-364088 (JP-A-2002-167472), filed Nov. 30, 2000 and further related to the following applications, and not only the fundamental concepts and preferred embodiments thereof but also all disclosure therein can be incorporated by reference in the present specification:
U.S. Pat. No. 6,087,431, JP-A-2001-261901, WO 00/61662, WO 00/61681, JP-A-2002-121329 (U.S. application Ser. No. 689,608), WO 01/48079 A1, JP-A-2001-342302, JP-A-2001-226524, JP-A-2002-146131, JP-A-2002-179879, JP-A-2002-167472 and JP-A-2002-69252

BACKGROUND OF THE INVENTION (1) Field of the Invention

The present invention relates to a rubbery polymer composition. More specifically, the present invention relates to a rubbery polymer composition, which is superior in scratch resistance, oil resistance and mechanical strength.

(2) Description of the Related Art

A thermoplastic elastomer composition obtained by so-called dynamic vulcanization is already known in the art and extensively applied for various uses such as car parts. According to the dynamic vulcanization, a radically vulcanizable elastomer and a resin having no radically vulcanizing property such as polypropylene (PP) are subjected to vulcanization, while melt-kneading in the presence of a radical initiator in an extruder.

As such a rubber composition, an olefinic elastomer obtained using ethylene-propylene-diene rubber (EPDM) is known (JP-A-8-120127 and JP-A-9-137001), and a dynamic vulcanization technology using the same is also known. However, such a rubber composition is inferior in its scratch resistance, and therefore it is not always satisfied in the market.

On the other hand, as a dynamic vulcanization technology using a saturated rubber, for example, there is known a dynamic vulcanization elastomer composition (JP-A-9-302156), which is obtained by using an olefinic copolymer rubber as the main constituent and a hydrogenated diene rubber as an auxiliary constituent and further blending a crystalline α-olefinic polymer, an ethylene polymer and a softening agent. Further, there is known a thermoplastic elastomer composition (JP-A-3-2240), which is obtained by melt-mixing a polyolefinic resin and a random or block copolymer of conjugated diene-aromatic vinyl monomer in the presence of a vulcanizing agent. The above-mentioned compositions are not always sufficient in their mechanical strength, scratch resistance, appearance and heat and light stability, and therefore a rubber composition sufficient to practical applications has been desired.

SUMMARY OF THE INVENTION

Under these circumstances, an object of the present invention is to provide a rubbery polymer composition, which is freed from the problems mentioned above, in other words, superior in its scratch resistance and mechanical strength.

The present inventors have undertaken extensive studies to improve a rubbery polymer composition. As a result, it has been found that when a combination of more than one specific vulcanizable rubbery polymer is used, surprisingly, its scratch resistance, oil resistance and mechanical strength can be far improved.

That is, the present invention provides as follows.

(1) A vulcanized rubbery polymer composition comprising a component (A) and a thermoplastic resin (B), wherein the component (A) comprises a hydrogenated copolymer (A-1), which is obtained by hydrogenating a copolymer comprising a conjugated diene monomer unit and an aromatic vinyl monomer unit and having an aromatic vinyl monomer content of not less than 5% by weight and not more than 90% by weight, and which has a crystallization peak calorie measured by a differential scan calorimetry (DSC method) of not more than 2 J/g, and at least one vulcanizable rubber (A-2) selected from the group consisting of a copolymer (a1) comprising an ethylene unit and an α-olefin unit of 3 to 20 carbon atoms and a hydrogenated rubber (a2) obtained from a homopolymer rubber of at least one conjugated diene monomer or a copolymer rubber comprising a conjugated diene monomer unit and an aromatic vinyl monomer unit and having an aromatic vinyl monomer content of less than 5% by weight.

(2) The rubbery polymer composition according to the above item (1), wherein the foregoing (a1) is a copolymer obtained by using a metallocene catalyst.

(3) The rubbery polymer composition according to the above item 1 or 2, wherein the foregoing hydrogenated copolymer (A-1) is the one hydrogenated to the extent that not less than 50% of the whole olefinic double bond is hydrogenated or a remaining double bond of the side chain is not more than 5%.

(4) The rubbery polymer composition according to any one of the above items 1 to 3, wherein the aromatic vinyl monomer content in the foregoing (A-1) is from 50 to 90% by weight.

(5) The rubbery polymer composition according to any one of the above items 1 to 4, wherein the foregoing (A-1) has a portion of the aromatic vinyl monomer which is randomly bonded.

(6) The rubbery polymer composition according to any one of the above items 1 to 5, wherein the foregoing (B) is a propylene resin.

(7) The rubbery polymer composition according to any one of the above items 1 to 6, wherein the foregoing (B) comprises a propylene random copolymer resin which has a flexural modulus of elasticity prescribed in JIS K6758 of from 10 to 1000 MPa and which comprises propylene as the main constituent and an α-olefin having 2 carbon atoms and/or an α-olefin having 4 to 20 carbon atoms.

(8) The rubbery polymer composition according to the above item 6 or 7, wherein the foregoing (B) is a propylene resin obtained by using a metallocene catalyst.

(9) The rubbery polymer composition according to the above items 1 to 8, which is a vulcanized one obtained by melt-kneading a mixture containing the hydrogenated copolymer (A-1), the vulcanizable rubber (A-2) and the thermoplastic resin (B) in the presence of a vulcanizing agent.

(10) The rubbery polymer composition according to any one of the above items 1 to 9, which further contains a softening agent (D).

The rubbery polymer composition in accordance with the present invention has superior scratch resistance, oil resistance and mechanical strength.

The composition in accordance with the present invention can be extensively applied for various uses such as car parts, car interior materials, air-bag covers, machine parts, electrical parts, cables, hoses, belts, toys, miscellaneous goods, daily necessaries, building materials, sheets and films, and the role that the composition plays in industry is significant.

DESCRIPTION OF THE PREFERRED EMBODIMENTS

Figure 1:
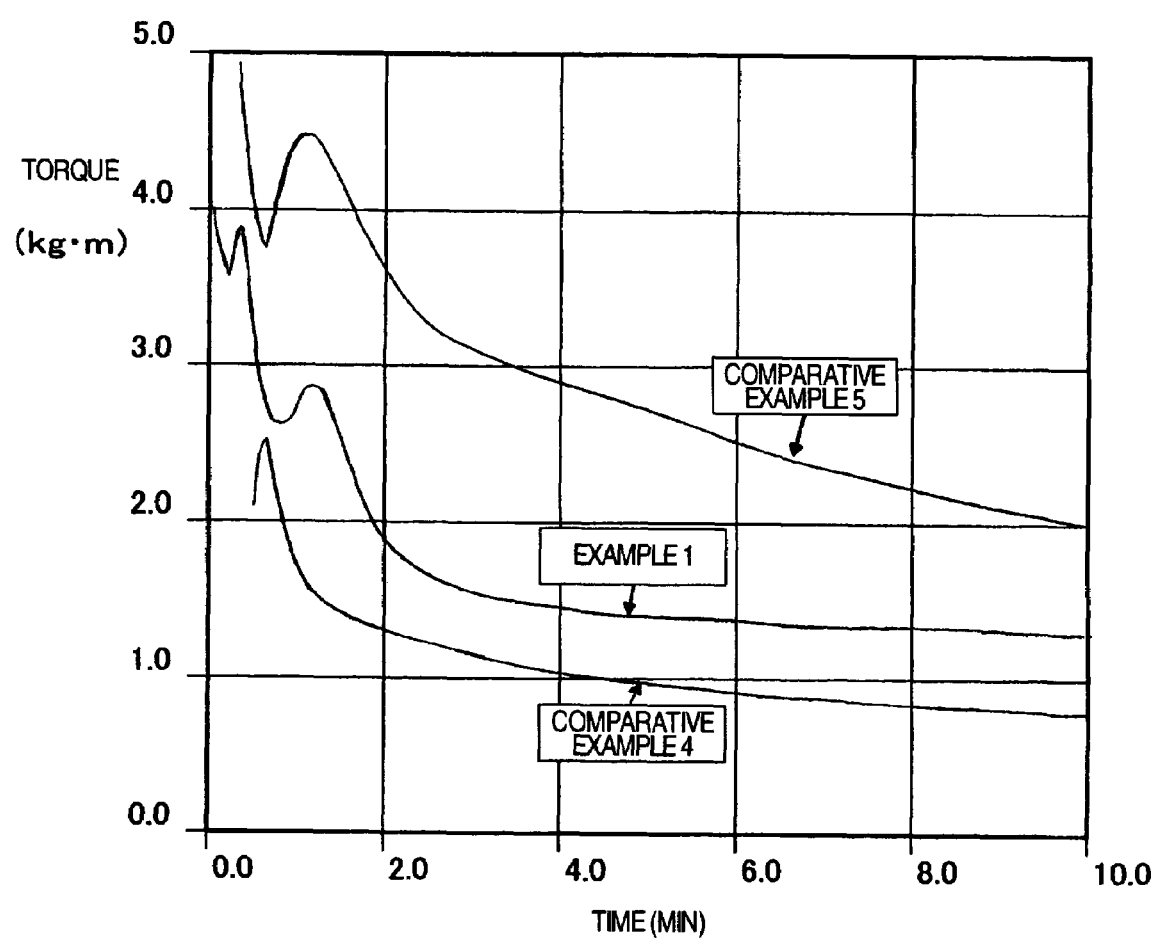
FIG. 1 shows change in torque (kgm) when the compositions obtained in Example 1 and Comparative Examples 4, 5 and 7 are melt-kneaded for 10 minutes under conditions of a setting temperature of 160° C. and a rotating rate of 100 rpm using a labo-plastomil manufactured by Toyo Seiki Seisakusho Co., Ltd. In Comparative Example 4, only (A-1) is used as the vulcanizable rubbery polymer, in Comparative Example 5, only (A-2) is used as the vulcanizable rubbery polymer, in Example 1, both (A-1)/(A-2) are used in a proportion of 50/50 as the vulcanizable rubbery polymer, and in Comparative Example 7, a vulcanizable rubbery polymer obtained so as to have the same composition as in Example 1, namely (A-1)/(A-2)=50/50, is used.

The composition in accordance with the present invention is a rubber composition obtained through vulcanization of two kinds of specific vulcanizable rubbery polymers, (A-1) and (A-2), and a thermoplastic resin (B).

Herein, it is important that the copolymers, (A-1) and (A-2), different from each other in their structure exist simultaneously at the time of the vulcanization reaction. The present inventors have found a fact that rather than a rubbery polymer composition obtained through the vulcanization reaction of any one of the above mentioned copolymers, the rubber composition obtained through the simultaneous vulcanization reaction of more than one copolymer as in the present invention, thereby exhibiting an interaction of both, can be further improved in its scratch resistance, oil resistance and mechanical strength. Thereby, the present invention has been accomplished.

Respective components used in the present invention are explained in detail as follows.

Component (A-1)

In the present invention, the hydrogenated copolymer (A-1) is a hydrogenated copolymer obtained through hydrogenation of a copolymer, which comprises a conjugated diene monomer unit and an aromatic vinyl monomer unit, and which has an aromatic vinyl content of not less than 5% by weight nor more than 90% by weight.

In producing the above-mentioned hydrogenated copolymer, if desired, a monomer copolymerizable with the conjugated diene monomer such as an olefin, methacrylic acid ester, acrylic acid ester, unsaturated nitrile or vinyl chloride type monomer may be copolymerized therewith.

Examples of the above-mentioned conjugated diene monomer are 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene and chloroprene. Preferred are 1,3-butadiene, isoprene and 1,3-pentadiene, and the most preferred are 1,3-butadiene and isoprene.

Examples of the above-mentioned aromatic vinyl monomer are styrene, α-methylstyrene, p-methylstyrene, t-butylstyrene, divinylbenzene, N,N-dimethyl-p-aminoethylstyrene and vinylpiridine. Preferred are styrene and α-methylstyrene. The above-mentioned aromatic vinyl monomer may be used singly or in combination of two or more. The content of the aromatic vinyl monomer is from 5 to 90% by weight, preferably from 20 to 90% by weight, and more preferably from 50 to 90% by weight. When the aromatic vinyl monomer content is from 50 to 90% by weight, the rubbery polymer composition finally obtained can be further improved in its abrasion resistance.

In the hydrogenated copolymer (A-1), the vinyl bond of the conjugated diene monomer portion before the hydrogenation may exist uniformly in the molecule, may increase or decrease along the molecule chain, or may be contained in several blocks different from one another in a vinyl bond content. It is preferred that the aromatic vinyl monomer or the above-mentioned monomer copolymerizable with the conjugated diene, if any, be bonded randomly to the above-mentioned conjugated diene monomer portion. However, it is permitted to contain the aromatic vinyl monomer or other monomers in a block form. The content of the block aromatic vinyl polymer is preferably not more than 20% by weight, and more preferably not more than 10% by weight, based on the weight of the hydrogenated copolymer.

It is preferred that the foregoing hydrogenated copolymer be hydrogenated to the extent that not less than 50% of the whole olefinic double bond, preferably not less than 90% thereof, and more preferably not less than 95% thereof is hydrogenated, and a remaining double bond in the main chain is not more than 5% and a remaining double bond in the side chain is not more than 5%. Examples of such a hydrogenated copolymer are those obtained by partially or completely hydrogenating diene polymers such as polybutadiene, poly(styrene-butadiene), poly(acrylonitrile-butadiene), polyisoprene, poly(styrene-isoprene) and polychloroprene. Particularly preferred are hydrogenated butadiene rubber and hydrogenated isoprene rubber. Such a hydrogenated copolymer can be obtained by partially hydrogenating the above-mentioned copolymer in a conventional hydrogenation manner. For example, there are mentioned a hydrogenation process with use of a triisobutylboran catalyst as described in F. L. Ramp, et al. J. Amer. Chem. Soc., 83, 4672 (1961), a hydrogenation process with use of toluene sulfonyl hydrazide as described in Hung Yu Chen, J. Polym. Sci. Polym. Letter Ed., 15, 271 (1977), and a hydrogenation process with use of an organic cobalt-organic aluminum catalyst or an organic nickel-organic aluminum catalyst as described in JP-B-42-8704. Here, particularly preferred are a hydrogenation process comprising using a catalyst capable of completing the hydrogenation under mild conditions of low temperature and low pressure as described in JP-A-59-133203 and JP-A-60-220147, and a process comprising contacting with hydrogen in an inert organic solvent in the presence of a catalyst comprising a bis(cyclopentadienyl) titanium compound and a hydrocarbon compound having a sodium, potassium, rubidium or cesium atom as described in JP-A-62-207303.

It is preferred that a viscosity of a 5% by weight styrene solution of the hydrogenated copolymer at 25° C. (5% SV) be within a range of from 20 to 300 centipoises (cps). A particularly preferable range is from 25 to 150 cps.

Further, it is preferred that the hydrogenated copolymer has non-crystallinity. The hydrogenated copolymer having a crystallization peak calorie of not more than 2 J/g, which is an index of the crystallinity and measured by a differential scanning calorimetry (DSC method), can be used.

In the present invention, it is preferred that a content of a hydrogenated copolymer having a molecular weight of not more than 150,000 calibrated with polystyrene standard in the hydrogenated copolymer (A-1) be not more than 30%. More preferable is not more than 25%, much more preferable is not more than 20%, the most preferable is not more than 15%, and extremely preferable is not more than 10%. When the above-mentioned content is not more than 30%, the vulcanizing property markedly increases to improve mechanical strength, appearance, feeling, abrasion resistance and oil resistance.

In the present invention, as a process for controlling the content of a hydrogenated copolymer having a molecular weight of not more than 150,000 calibrated with polystyrene standard in (A-1), there are mentioned a process wherein the whole molecular weight is increased to make a portion having a molecular weight of not more than 150,000 not more than 30%, a process wherein the portion having a molecular weight of not more than 150,000 is removed through an operation such as extraction, and a process wherein polymerization is carried out using a polymerization catalyst as not to produce the portion having a molecular weight of not more than 150,000.

Component (A-2)

In the present invention, the vulcanizable rubber (A-2) is at least one member selected from the group consisting of a copolymer (a1) comprising an ethylene unit and an α-olefin unit of 3 to 20 carbon atoms and a hydrogenated rubber (a2) obtained from a homopolymer rubber of at least one conjugated diene monomer or a copolymer rubber comprising a conjugated diene monomer unit and an aromatic vinyl monomer unit and having an aromatic vinyl monomer content of less than 5% by weight.

The above-mentioned (a1), namely the ethylene/α-olefin copolymer is a copolymer of ethylene and an α-olefin having 3 to 20 carbon atoms. Examples of the α-olefin are propylene, butene-1, pentene-1, hexene-1, 4-methylpentene-1, heptene-1, octene-1, nonene-1, decene-1, undecene-1 and dodecene-1. Of these, preferred are α-olefins having 3 to 12 carbon atoms. Particularly, propylene, butene-1 and octene-1 are the most preferred. If necessary, the (a1) may comprise a monomer having an unsaturated bond. Preferred examples thereof are conjugated diolefins such as butadiene and isoprene, non-conjugated diolefins such as 1,4-hexadiene, cyclic diene compounds such as dicyclopentadiene (DCP) and norbornene derivatives, and acetylenes. Particularly, ethylidene norbornene (ENB) and dicyclopentadiene (DCP) are the most preferred.

It is preferred that Mooney viscosity of the (a1) measured at 100° C. (ML) be from 20 to 150. More preferred is from 50 to 120.

In the present invention, it is preferred that the (a1), namely the ethylene/α-olefin copolymer be obtained using a conventional metallocene catalyst.

Generally speaking, the metallocene catalyst comprises a cyclopentadienyl derivative of a IV group metal such as titanium and zirconium and a co-catalyst, and exhibits a high activity as a polymerization catalyst. Moreover, as compared with a Ziegler catalyst, a molecular weight distribution of the polymer obtained is narrower, and a distribution of the α-olefin having 3 to 20 carbon atoms, which is a comonomer in the copolymer, is more uniform.

It is preferred that a copolymerization proportion of the α-olefin in the (a1) used in the present invention be from 1 to 60% by weight. More preferred is from 10 to 50% by weight, and the most preferred is from 20 to 45% by weight. When the copolymerization proportion of the α-olefin is within the above-mentioned range, the composition can be improved in its mechanical strength such as tensile strength and in flexibility.

Further, it is preferred that density of the (a1) ranges from 0.8 to 0.9 g/cm$^3$. By using an olefinic elastomer having a density within said range, an elastomer composition superior in its flexibility and low in its hardness can be obtained.

It is desired that the (a1) used in the present invention has a long branched chain. Owing to the presence of the long branched chain, it becomes possible to further lessen a density for the α-olefin copolymerization proportion (% by weight) without detriment to the mechanical strength, and thereby, an elastomer having low density, low hardness and high strength can be obtained. The olefinic elastomer having a long branched chain is described in, for example, U.S. Pat. No. 5,278,272.

Further, it is desired that the (a1) has a melting point peak in DSC in a region of a temperature not lower than ambient temperature. When it has such a melting point peak, a form is stable within a temperature range not higher than the melting point, so that superior handling and little stickiness can be attained.

As the (a1), those having a melt index of from 0.01 to 100 g/10 min (190° C., 2.16 kg load (0.212 Pa)) are preferably used in the present invention. More preferably, those having a melt index of from 0.2 to 10 g/10 min are used. Within such a range, balance between the flowability and the mechanical strength is made superior.

In the present invention, the above-mentioned (a2) is a rubbery polymer obtained through hydrogenation of a homopolymer rubber of at least one conjugated diene monomer. Alternatively, the (a2) is a rubbery polymer obtained through hydrogenation of a copolymer comprising a conjugated diene monomer unit and an aromatic vinyl monomer unit and having an aromatic vinyl monomer content of less than 5% by weight.

It is preferred that the (a2) be hydrogenated to the extent that not less than 50%, preferably not less than 90%, and more preferably not less than 95% of the whole olefinic double bond is hydrogenated, and a remaining double bond of the main chain be not more than 5% and that of the side chain be not more than 5%.

Requirements for the (a2) are the same as those for the (a1), excepting requirements relating to the above-mentioned copolymerization proportion and crystallinity. The crystallinity of the (a2) is not particularly limited. However, it is preferred that the (a2) has crystallinity, and a crystallization peak calorie, which is an index of the crystallinity and measured by the above-mentioned DSC method, is not less than 3 J/g. Control of the crystallization peak calorie can be attained through addition of a polar compound such as tetrahydrofuran or through control of a polymerization temperature. The polar compound can be increased or the polymerization temperature can be lowered, so that a 1,2-vinyl bond can be increased, and as a result, decrease of the crystallization peak calorie can be attained.

Component (B)

In the present invention, the thermoplastic resin (B) is not particularly limited, as far as it is dispersible with the component (A). For example, polystyrenes, polyphenylene ethers, polyolefins, polyvinyl chlorides, polyamides, polyesters, polyphenylene sulfides, polycarbonates and polymethacrylates can be used singly or in combination of two or more. Particularly, as the thermoplastic resin, an olefinic resin (B-1) is the most preferable, and a thermoplastic resin (B-2) other than (B-1) can be suitably used.

In the present invention, the above-mentioned (B-1) includes a homopolymer of ethylene and/or α-olefin having 2 to 20 carbon atoms and a copolymer resin comprising two or more thereof, such as ethylene resins and propylene resins. Particularly preferred are propylene resins.

Specific examples of the propylene resins the most suitably used in the present invention are isotactic propylene homopolymers and isotactic copolymer resins (including block and random ones) of propylene and other α-olefins such as ethylene, butene-1, pentene-1 and hexene-1.

In the present invention, among the (B), preferred are a vulcanization type olefinic resin (B-1a), which includes a propylene random copolymer resin such as a random copolymer of ethylene and propylene, and a combination of (B-1a) and a decomposition type olefinic resin (B-1b), which includes either a propylene block copolymer resin or a propylene homopolymer resin. When two kinds of olefinic resins, namely the vulcanization type olefinic resin and the decomposition type olefinic resin are used in combination, the appearance and mechanical strength can be further improved.

As an example of the (B-1a), there is mentioned a random copolymer resin of ethylene and propylene. In the copolymer, when the ethylene component exists in the main chain of the polymer, such a point becomes a vulcanization point for the vulcanization reaction, thereby showing the characteristic features of the vulcanization type resin.

In the (B-1b), it is preferred that an α-olefin be the main component, and the main chain of the polymer contains no ethylene unit. However, in the case where an ethylene-α-olefin copolymer exists as a disperse phase like the propylene block copolymer resin, the characteristic features of the decomposition type olefinic resin can be shown.

The (B) may be a combination of several numbers of the (B-1a) component and (B-1b) component.

The random copolymer resin comprising an α-olefin and propylene as the main constituent, which is the most preferable among the (B-1a), can be produced according to, for example, a high pressure method, a slurry method, a gas phase method, a bulk method or a solution method. As a polymerization catalyst, a Ziegler-Natta catalyst, a single site catalyst and a metallocene catalyst are preferred. Particularly when the composition distribution and molecular weight distribution are required to be narrow, it is preferred to carry out a random copolymerization method using a metallocene catalyst.

A specific example of a process for producing the random copolymer resin is disclosed as follows in European Patent Publication No. 0969043A1 and U.S. Pat. No. 5,198,401. Liquefied propylene is introduced into a reactor equipped with a stirrer, and then a catalyst is added to a gas phase or a liquid phase through a nozzle. Successively, an ethylene gas or an α-olefin is introduced into the gas phase or the liquid phase in the reactor, and reaction temperature and reaction pressure are controlled under such conditions that propylene is refluxed. A polymerization rate is controlled by a catalyst concentration and reaction temperature, and a copolymerization composition is controlled by an amount of ethylene or the α-olefin added.

A melt index of the olefinic resin suitably used in the present invention is preferably within a range of from 0.1 to 100 g/10 min (230° C., 2.16 kg load (0.212 Pa)). It is not desired that the melt index exceeds 100 g/10 min, because the thermoplastic elastomer composition becomes insufficient in its heat resistance and mechanical strength. It is not desired that the melt index is less than 0.1 g/10 min, because flowability becomes inferior and molding processability decreases.

The above-mentioned (B-2) suitably used as the component (B) in the present invention includes a thermoplastic resin, which is, for example, a polyphenylene ether, a polyvinyl chloride, a polyamide, a polyester, a polyphenylene sulfide, a polycarbonate, a poly(meth)acrylate, a polyurethane or a polystyrene copolymer alone or a combination of two or more thereof.

The aromatic polycarbonate used as the above-mentioned (B-2) can be selected from the group consisting of an aromatic homopolycarbonate and an aromatic copolycarbonate. As a process for producing the same, there are mentioned a phosgene process wherein phosgene is blown into a bifunctional phenolic compound in the presence of a caustic alkali and a solvent, and a transesterification process wherein a bifunctional phenolic compound and diethyl carbonate are subjected to transesterification in the presence of a catalyst. It is preferred that a viscosity average molecular weight of the aromatic polycarbonate be within a range of from 10,000 to 100,000. Here, examples of the bifunctional phenolic compound are 2,2'-bis(4-hydroxyphenyl)propane, 2,2'-bis(4-hydroxy-3,5-dimethylphenyl)propane, bis(4-hydroxyphenyl)methane, 1,1'-bis(4-hydroxyphenyl)ethane, 2,2'-bis(4-hydroxyphenyl)butane, 2,2'-bis(4-hydroxy-3,5-diphenyl)butane, 2,2'-bis(4-hydroxy-3,5-dipropylphenyl)propane, 1,1'-bis(4-hydroxyphenyl)cyclohexane and 1-phenyl-1,1'-bis(4-hydroxyphenyl)ethane. Particularly, 2,2'-bis(4-hydroxyphenyl)propane [bisphenol A] is preferred. In the present invention, the bifunctional phenolic compound may be used singly or in combination thereof.

The poly(meth)acrylate used as the above-mentioned component (B-2) in the present invention includes a polymethacrylate and a polyacrylate. More specifically, it includes a homopolymer of a (meth)acrylic acid ester monomer and a copolymer comprising said monomer as the main constituent and a monomer copolymerizable with said monomer. Examples of these monomers are an unsaturated nitrile monomer such as acrylonitrile and methacrylonitrile, a $C_{1-8}$ alkyl group-carrying (meth)acrylic acid ester other than the main constituent (meth)acrylic acid ester, α-methylstyrene, acrylic acid, methacrylic acid, maleic anhydride and an N-substituted maleimide. A content of the above-mentioned copolymerizable monomer in the monomer mixture is from 0 to 40% by weight. Among the above-mentioned poly(meth)acrylates, particularly preferred is a copolymer of 80 to 99% by weight of methyl metacrylate and 1 to 20% by weight of methyl acrylate or butyl acrylate, which can be obtained according to a conventional radical polymerization process.

The styrene copolymer used as the above-mentioned component (B-2) in the present invention includes a copolymer between an aromatic vinyl monomer such as styrene, α-methylstyrene, p-methylstyrene and a halogenated styrene as the essential component, and another monomer such as an unsaturated nitrile monomer such as acrylonitrile and methacrylonitrile, a $C_{1-8}$ alkyl group-carrying acrylic acid ester or methacrylic acid ester, acrylic acid, methacrylic acid, maleic anhydride and an N-substituted maleimide. If necessary, it is possible to modify the styrene copolymer with rubber. A rubber-modified styrene copolymer obtained by dispersing a rubbery polymer of a particle form in a matrix of the above-mentioned styrene copolymer is also favorably used.

Examples of these rubber-modified styrene copolymers are ABS resin (acrylonitrile-butadiene-styrene copolymer), AAS resin (acrylonitrile-acrylic rubber-styrene copolymer) and AES resin (acrylonitrile-ethylene propylene rubber-styrene copolymer).

The polyphenylene ether, which is one embodiment of the component (B-2) in the present invention, includes a homopolymer and/or a copolymer formed in a manner such that aromatic rings are contained in the main chain, and bonded with one another through an ether linkage. Specifically, poly(2,6-dimethyl-1,4-phenylene ether) and a copolymer of 2,6-dimethylphenol and 2,3,6-trimethylphenol are preferred. Particularly preferred is poly(2,6-dimethyl-1,4-phenylene ether). The polyphenylene ether can be obtained according to any process, which is not particularly limited. For example, the polyphenylene ether can be easily obtained by subjecting, for example, 2,6-xylenol to oxidation polymerization using a complex of a cuprous salt and an amine as a catalyst according to a process described in U.S. Pat. No. 3,306,874. Further, the polyphenylene ether can be easily obtained according to a process described in U.S. Pat. No. 3,306,875, U.S. Pat. No. 3,257,357, U.S. Pat. No. 3,257,358, JP-B-52-17880 or JP-A-50-51197. It is preferred that a reduced viscosity $\eta sp/c$ (measured using a 0.5 g/dl chloroform solution at 30° C.) of the above-mentioned polyphenylene ether used in the present invention be within a range of from 0.20 to 0.70 dl/g. More preferably, it is within a range of from 0.30 to 0.60 dl/g. The above-mentioned requirement relating to the reduced viscosity $\eta sp/c$ of the polyphenylene ether can be satisfied, for example, by controlling an amount of the catalyst at the time of production of the above-mentioned polyphenylene ether.

In the present invention, it is preferred that a content of the (A) in 100 parts by weight of the rubber composition comprising (A) and (B) be from 1 to 99% by weight. More preferred is from 10 to 90% by weight, and the most preferred is from 20 to 80% by weight. When the component (A) is within the above-mentioned range, the composition is superior in its balance characteristics between the mechanical strength and the flexibility.

Component (C)

It is preferred that the composition in accordance with the present invention be vulcanized with the aid of a vulcanizing agent (C). The (C) contains a vulcanization initiator (C-1) as the essential component, and if desired, further contains a polyfunctional monomer (C-2) and a monofunctional monomer (C-3). The above-mentioned (C) can be used in an amount of from 0.001 to 10 parts by weight, and preferably from 0.005 to 3 parts by weight, based on 100 parts by weight of (A) and (B). When the amount is less than 0.001 part by weight, the vulcanization is apt to be insufficient, and when the amount exceeds 10 parts by weight, the appearance and mechanical strength of the composition are apt to decrease.

Here, the vulcanization initiator (C-1) includes a radical initiator such as an organic peroxide and an organic azo compound. Specific examples thereof are peroxy ketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane, 1,1-bis(t-butylperoxy)cyclododecane, 1,1-bis(t-butylperoxy)cyclohexane, 2,2-bis(t-butylperoxy)octane, n-butyl-4,4-bis(t-butylperoxy)butane and n-butyl-4,4-bis(t-butylperoxy)valerate; dialkyl peroxides such as di-t-butyl peroxide, dicumyl peroxide, t-butylcumyl peroxide, $\alpha,\alpha'$-bis(t-butylperoxy-m-isopropyl)benzene, $\alpha,\alpha'$-bis(t-butylperoxy)diisopropylbenzene, 2,5-dimethyl-2,5-bis(t-butylperoxy)hexane and 2,5-dimethyl-2,5-bis(t-butylperoxy)hexyne-3; diacyl peroxides such as acetyl peroxide, isobutylyl peroxide, octanoyl peroxide, decanoyl peroxide, lauroyl peroxide, 3,5,5-trimethylhexanoyl peroxide, benzoyl peroxide, 2,4-dichlorobenzoyl peroxide and m-toluoyl peroxide; peroxy esters such as t-butylperoxy acetate, t-butylperoxy isobutylate, t-butylperoxy-2-ethylhexanoate, t-butylperoxy laurate, t-butylperoxy benzoate, di-t-butylperoxy isophthalate, 2,5-dimethyl-2,5-di(benzoylperoxy)hexane, t-butylperoxy maleate, t-butylperoxy isopropyl carbonate and cumylperoxy octate; and hydroperoxides such as t-butyl hydroperoxide, cumene hydroperoxide, diisopropylbenzene hydroperoxide, 2,5-dimethylhexane-2,5-dihydroperoxide and 1,1,3,3-tetramethylbutyl peroxide.

Among these compounds, preferred are 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)hexyne-3.

The above-mentioned (C-1) is used in an amount of preferably from 1 to 80% by weight, and more preferably from 10 to 50% by weight based on the weight of the component (C). When the amount is less than 1% by weight, the vulcanization is insufficient, and when the amount exceeds 80% by weight, the mechanical strength decreases.

In the present invention, it is preferred that the polyfunctional monomer (C-2), which is one component in the vulcanizing agent (C), has a functional group having radical polymerization ability as the functional group. It is particularly preferred that it has a vinyl group. The number of the functional group is 2 or more. It is effective that it has 3 or more functional groups particularly when used in combination with the (C-3). Specific examples thereof are divinylbenzene, triallyl isocyanurate, triallyl cyanurate, diacetone diacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, p-quinone dioxime, p,p'-dibenzoylquinone dioxime, phenymaleimide, allyl methacrylate, N,N'-m-phenylenebismaleimide, diallyl phthalate, tetraallyl oxyethane and 1,2-polybutadiene. Particularly triallyl isocyanurate is preferred. More than one polyfunctional monomer may be used at the same time.

The above-mentioned (C-2) can be used in an amount of preferably from 1 to 80% by weight, and more preferably from 10 to 50% by weight based on the weight of the component (C). Within such a range, the mechanical strength can be improved.

The above-mentioned (C-3) used in the present invention is a vinyl monomer, which is added for the purpose of controlling a vulcanization reaction rate. Preferred is a vinyl monomer having radical polymerization ability. Examples thereof are aromatic vinyl monomers, unsaturated nitrile monomers such as acrylonitrile and methacrylonitrile, ester monomers such as an acrylic acid ester monomer and a methacrylic acid ester monomer, unsaturated carboxylic acid monomers such as an acrylic acid monomer and a methacrylic acid monomer, unsaturated carboxylic acid anhydrides such as a maleic anhydride monomer, and N-substituted maleimide monomers.

The above-mentioned (C-3) can be used in an amount of preferably from 1 to 80% by weight, and more preferably from 10 to 50% by weight based on the weight of the component (C). Within such a range, the mechanical strength can be improved.

In the present invention, the most preferred combination for preparing the vulcanizing agent (C) is a combination of 2,5-dimethyl-2,5-bis(t-butylperoxy)hexane (a commercial name of Perhexa 25B, manufactured by NOF Corporation) or 2,5-dimethyl-2,5-bis(t-butylperoxy)hexyn-3 (manufactured by NOF Corporation) as the vulcanization initiator, and triallyl isocyanurate (TAIC, manufactured by Nippon Kasei Chemical Industry Co., Ltd.) as the polyfunctional monomer, because of superior mechanical strength and retention of a softening agent (D), if any, as mentioned below.

Component (D)

As the above-mentioned (D), preferred are process oil comprising paraffin, naphthenic or aromatic hydrocarbons. Particularly preferred are process oil comprising paraffin hydrocarbons as the main constituent. From the viewpoint of compatibility with rubber, process oil comprising naphthenic hydrocarbons as the main constituent are preferred. From the viewpoint of heat and light stability, a content of the aromatic hydrocarbons in the process oil is preferably not more than 10%, more preferably not more than 5%, and the most preferably not more than 1%, in terms of a carbon number ratio as prescribed in ASTM D2140-97.

The component (D) can be used for the purpose of controlling hardness and flexibility of the composition in an amount of from 5 to 500 parts by weight, and preferably from 10 to 150 parts by weight, based on 100 parts by weight of (A) and (B). It is not desired that the amount is less than 5 parts by weight, because flexibility and processability become insufficient, and it is not desired that it exceeds 500 parts by weight, because oil bleeding becomes remarkable.

In the present invention, when abrasion resistance is required, a polyorganosiloxane having a kinematic viscosity of not less than 5000 centistokes ($5 \times 10^{-3}$ m$^2$/sec) at 25° C. measured according to JIS-K2410 may be added, when necessary.

The above-mentioned polyorganosiloxane is not particularly limited as far as it is viscous like starch syrup or gum and is a polymer having an alkyl, vinyl and/or allyl group-substituted siloxane unit. Of these, the most preferred is polydimethylsiloxane.

The kinematic viscosity (25° C.) of the polyorganosiloxane used in the present invention is not less than 5,000 cs ($5 \times 10^{-3}$ m$^2$/sec), preferably from not less than 10,000 cs ($1 \times 10^{-2}$ m$^2$/sec) to less than 10,000,000 cs (10 m$^2$/sec), and the most preferably from not less than 50,000 cs (0.05 m$^2$/sec) to less than 2,000,000 cs (2 m$^2$/sec).

In the present invention, the polyorganosiloxane can be added in an amount of preferably from 0.01 to 20 parts by weight based on 100 parts by weight of the sum of (A) and (B). More preferable is from 0.1 to 10 parts by weight based thereon, and the most preferable is from 0.5 to 5 parts by weight based thereon.

When one of the compositions in accordance with the present invention, which comprises (A) and (B), is required to have high temperature rubber characteristics such as high temperature compression permanent strain and high temperature mechanical strength, it is necessary to control the crystallinity of (B) in the composition. It is preferred that crystallization temperature and crystallization calorie of (B) measured according to a differential scanning calorimetry (DSC method) as defined below be within a range of from 110 to 150° C., and a range of from 30 to 200 J/g, respectively.

The crystallization temperature and crystallization calorie of (B) in the composition were measured according to a differential scanning calorimetry (DSC method). More specifically, using a thermal analysis apparatus, DSC 50, manufactured by Shimadzu Corporation, 5 mg of a sample was treated under nitrogen gas flow in a manner such that temperature was raised from ambient temperature to 230° C. at a rate of 30° C./min, and immediately after reaching 230° C., the temperature was lowered to 50° C. at a rate of 5° C./min. From a crystallization peak detected at this stage, the crystallization temperature and the crystallization calorie were obtained.

Here, the crystallization temperature was a peak top temperature (° C.), and the crystallization peak calorie (J/g) was calculated from the area of a peak surrounded with a curve showing a calorie variation shifted to the base line. The above-mentioned curve includes any of a broad curve and a sharp curve. A straight line is drawn in parallel to the base line, and a point at which the resulting tangent is crossed with the curve showing a calorie variation is taken as the peak top temperature.

In the present invention, how to control the crystallinity is not limited. For example, there are mentioned a process comprising using an olefinic resin having a high crystallinity so as to obtain the composition in accordance with the present invention, and a process comprising adding a crystallinity improving agent to an olefin resin having a low crystallinity, thereby obtaining the composition in accordance with the present invention.

Typical examples of the above-mentioned crystallinity improving agent are a crystal nucleating agent classified into a phosphoric acid ester type, a sorbitol type and a carboxylic acid salt type, and an inorganic filler.

Specific examples of the above-mentioned crystal nucleating agent are sodium 2,2'-methylenebis(4,6-di-t-butylphenyl)phosphate, bis(p-methylbenzylidene)sorbitol and bis(p-ethylbenzylidene)sorbitol. Specific examples of the above-mentioned inorganic filler are single substances such as aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide and tungsten oxide and their complexes (alloy), hydrates of an inorganic metal compound such as hydrates of aluminum hydroxide, magnesium hydroxide, dolomite, hydrotalcite, zeolite, calcium hydroxide, barium hydroxide, basic magnesium carbonate, zirconium hydroxide and tin hydroxide, zinc borate, zinc metaborate, barium metaborate, zinc carbonate, magnesium carbonate, Moucalcium, calcium carbonate, barium carbonate, kaolin, montmorillonite, bentonite, clay, mica and talc. Of these, preferred are plate like fillers, and particularly preferred are talc, mica and kaolin.

The above-mentioned crystallinity improving agent can be added in an amount of preferably from 0.01 to 200 parts by weight, more preferably from 0.1 to 150 parts by weight, the most preferably from 0.1 to 100 parts by weight, and extremely preferably from 0.1 to 50 parts by weight, based on 100 parts by weight of the composition of (A) and (B).

Further, the composition in accordance with the present invention may contain other inorganic fillers, plasticizers, organic and inorganic pigments, heat stabilizers, antioxidants, ultraviolet absorbers, light stabilizers, flame retardants, silicone oil, anti-blocking agents, foaming agents, anti-static agents and anti-microbial agents as far as its characteristic features are not impaired.

In producing the composition in accordance with the present invention, there can be applied a conventional method using Banbury mixer, a kneader, a single screw extruder and a twin screw extruder, which have been used for the production of a usual resin composition and a usual rubber composition. Particularly, in order to attain dynamic vulcanization effectively, it is preferred to use a twin screw extruder. The twin screw extruder is more suitable for dispersing (A) and (B) uniformly and finely and causing vulcanization reaction in the presence of the other arbitrary components, thereby continuously producing the composition in accordance with the present invention.

More specifically, the composition in accordance with the present invention can be produced through the following processing steps. That is, (A) ((A-1) and (A-2)) and (B) are thoroughly blended and then fed into a hopper of an extruder. At this time, it is preferred that (A-1) and (A-2) be added into the extruder at the same time and melt-kneaded therein. (C) may be added from the beginning together with (A) and (B), or may be added on the way into the extruder. Further, oil may be added on the way into the extruder. Alternatively, the oil to be added may be divided into two parts, namely a part from the beginning and another part on the way. A part of (A) and (B) may be added on the way into the extruder. In the course of kneading under heat melting in the extruder, the vulcanization reaction between (A) and (C) is caused, and further by adding (D) thereto and melt-kneading it with one another, the vulcanization reaction and kneading dispersion are thoroughly conducted. Thereafter, the resultant is taken out of the extruder, and as a result, the composition in accordance with the present invention can be obtained in a pellet form.

In a particularly preferred melt extrusion method, there is used a twin screw extruder having a screw length of L from a material feeding port in the direction of a die and an L/D of from 5 to 100, wherein D is a barrel diameter. It is preferred that the twin screw extruder has several supplying ports at more than one position, which supplying ports include a main hopper and a side feeding port, and which are different in their distance from the top portion of the extruder, and the twin extruder further has respective kneading means between said several supplying ports and between the top portion and the supplying port closest to the top portion, which respective kneading means have a length of from 3D to 10D.

The twin screw extruder, which is one of production apparatuses used in the present invention may be a uni-directional rotating twin screw extruder or a multi-directional rotating twin screw extruder. With respect to a mesh of the screw, any of non-meshing type, partial meshing type and complete meshing type may be applied. In order to obtain a uniform resin at a low temperature with a low shearing power applied, it is preferred to use a uni-directional rotating partial meshing type screw. When somewhat stronger kneading is required, a uni-directional rotating complete meshing type screw is preferred. When further stronger kneading is required, a uni-directional rotating complete meshing type screw is preferred.

The most preferred process for producing the composition in accordance with the present invention comprises melt-blending (A) and (B) with each other, and thereafter carrying out vulcanization with the aid of (C).

In the present invention, a vulcanization degree X and vulcanization density Y of (A), which are indexes of a vulcanization degree and a vulcanization density, respectively, are defined as follows. Weight of (A), W0, in the composition is measured in advance. Thereafter, the composition is refluxed in 200 ml of xylene for 20 hours, and the solution is filtered with a filter. Weight of the swollen composition (W1) is measured. Successively, the above-mentioned swollen composition is vacuum-dried at 100° C., and weight thereof (W2) is again measured. X and Y are calculated as follows.

$$X=(W2/W0)\times 100\ (\%)$$

$$Y=W2/W1$$

X and Y can be controlled by appropriately selecting the kind and amount to be used of vulcanization initiator (C-1) and the vulcanization assistant(s) (C-2) and/or (C-3), a reaction temperature and a reaction manner. X can be increased with increase in the vulcanization initiator and the vulcanization assistant(s) and by carrying out the reaction at the lowest possible temperature not lower than a decomposition temperature of the vulcanization initiator for a long period of time. On the other hand, Y can be increased with increase in the polyfunctional vulcanization assistant (C-2) having a larger number of the functional group. In order to increase Y, it is preferred to decrease the vinyl monomer (C-3) having radical polymerization ability. Further, (C-2) and (C-3) can be used at the same time to control the reaction rate. If the vulcanization initiator and the vulcanization assistant(s) are added in an excessive amount, both X and Y are increased together, and as a result, the requisites of the present invention cannot be satisfied. It is preferred that an amount ratio of (C-1)/(C-2)/(C-3) be within a range of 1/1 to 5/0 to 0.5. More preferred is within a range of 1/1 to 4/0 to 0.3, and the most preferred is within a range of 1/1 to 3/0 to 0.1.

Further, an excessively high active vulcanization initiator or vulcanization assistant(s), or high temperature conditions result in increase in both X and Y, and as a result, the requisites of the present invention cannot be satisfied. When a small amount of (D) is absorbed in (A) in advance, and then the vulcanization initiator and the vulcanization assistant(s) are blended with (A), the vulcanization reaction can proceed mildly, so that X can be increased while controlling increase of Y.

As a specific production process, according to which X and Y in the present invention can be satisfied, for example, it is preferred to apply a process satisfying the following kneading degree.

$$M=(\pi^2/2)(L/D)D^3(N/Q)$$

$$10\times 10^6 \leq M \leq 1000\times 10^6$$

wherein L is a length of an extruder from a material feeding port in the direction of a die (mm), D is a barrel inner diameter of an extruder (mm), Q is an output (kg/h), and N is the rotating number of a screw (rpm).

As another specific production process, according to which X and Y in the present invention can be satisfied, for example, it is preferred to satisfy a melting temperature of the following relation expression. That is, in the first place, melt-kneading is carried out at a melting temperature T2 (° C.), and successively carried out at a melting temperature T3 (° C.). Particularly, using a melt extruder having a length of L from a material feeding port in the direction of a die, in the first place, melt-kneading is carried out at a melting temperature T2 (° C.) in an extruder zone within a length of from 0.1 L to 0.5 L from the material feeding port, and successively carried out at a melting temperature T3 (° C.) in the remaining extruder zone.

Herein, the below defined T1 is particularly preferably from 150 to 250° C., and T1 and T2 in each zone of the melt extruder may be a uniform temperature, or there may be a temperature gradient between them.

T1: 1-minute half-life temperature of (C) (° C.)

$T1-100<T2<T1+40$ $T2+1<T3<T2+200$

How to add the softening agent (D) is important to satisfy X and Y in the present invention. As one embodiment of production processes, using an extruder having one main hopper and more than one supplying port capable of side-feeding, which are different from one another in distance from a top portion, (A), (B), (C) and (D) are melt-kneaded to perform dynamic vulcanization. In this case, it is preferred that (D) to be fed be divided into more than one part, and fed separately into the more than one supplying port.

Herein, it is preferred that (D) to be fed be divided into more than one part, and fed separately into the more than one supplying port. By feeding (D) separately, melt viscosity at the time of the dynamic vulcanization in the first half of the extruder decreases to control the reaction rate, and as a result, the swelling degree increases. The division number of (D) or the amount to be added thereof can be determined to control Y.

The thus obtained olefinic rubber composition can be molded into various molded products in an arbitrary molding manner. Injection molding, extrusion molding, compression molding, blow molding, calendering and foaming can be suitably applied.

The present invention is explained in more detail with reference to Examples and Comparative Examples, which are not intended to limit the scope of the present invention. In these Examples and Comparative Examples, test methods used for the evaluation of various physical properties are as follows.

1. Hydrogenation Percent of (A) (%)

It was measured according to a usual NMR method.

2. Crystallization Temperature and Crystallization Peak Calorie

The crystallization temperature and crystallization peak calorie were measured according to a differential scanning calorimetry (DSC method). More specifically, using a thermal analysis apparatus system, WS002, manufactured by MAK SCIENCE Co., in Japan, 10 mg of a sample was treated under nitrogen gas flow in a manner such that temperature was raised from ambient temperature to 100° C. at a rate of 10° C./min, and immediately after reaching 100° C., the temperature was lowered to −100° C. at a rate of 10° C./min. From a crystallization peak detected at this stage, the crystallization temperature and the crystallization peak calorie were obtained in this application.

Here, the crystallization temperature was a peak top temperature (° C.), and the crystallization peak calorie (J/g) was calculated from the area of a peak surrounded with a curve showing a calorie variation shifted to the base line. The above-mentioned curve includes any of a broad curve and a sharp curve. Further, a straight line is drawn in parallel to the base line, and a point at which the resulting tangent is crossed with the curve showing a calorie variation is taken as the peak top temperature.

3. Tensile Strength [MPa]

It was evaluated at 23° C. according to JIS K6251.

4. Scratch Resistance

A wedge having a rectangular head of 10 mm of its length and 1 mm of its width and a weight of 600 g was dropped from a height of 5 cm on a sheet. Thereby, a scratch produced on the sheet was visually evaluated on the basis of the following criteria.

⊚: Very good

○: Good

Δ: Good, but a scratch is observed

×: Remarkably scratched

At the same time, depth of the scratch on the sheet was measured through scanning of a laser beam.

5. Oil Resistance

Weight of a sheet of the composition having a thickness of 2 mm, $W_0$, was measured in advance. Thereafter, the sheet of the composition was allowed to stand for 20 hours in liquid paraffin of 80° C. Then, the weight of the sheet of the composition, $W_1$, was measured, and a weight increasing ratio was calculated as follows. Here, the smaller the numerical value, the better the oil resistance.

Weight increasing ratio=$(W_1-W_0)/W_0 \times 100$ (%)

6. Vulcanization Degree (X) and Vulcanization Density (Y)

X and Y of (A) are indexes of a vulcanization degree and a vulcanization density, respectively, and defined as mentioned above.

Respective components used in Examples and Comparative Examples were as follows.

(a) Hydrogenated copolymer (A-1) and hydrogenated rubber (a2)

Using a 10 liter-inner volume jacketed autoclave equipped with a stirrer as a reactor, continuous polymerization of butadiene was carried out at 110° C. in a manner such that a butadiene/n-hexane solution (butadiene concentration 20% by weight) and a n-butyl lithium/n-hexane solution (concentration 5% by weight) were fed in the reactor at a rate of 20 liter/hr and 70 ml/hr, respectively. Methanol was added thereto to deactivate the resulting active polymer. Eight liters of the polymer solution was transferred to another 10 liter-inner volume jacketed reactor equipped with a stirrer, and as a hydrogenation catalyst, a mixture prepared by mixing 250 ml of a di-p-tolylbis(1-cyclopentadienyl) titanium/cyclohexane solution (concentration 1 ml/liter) and 50 ml of a n-butyl lithium solution (concentration 5 ml/liter) at 0° C. under hydrogen pressure of 2 kg/cm$^2$ was added thereto at 60° C., and the reaction was continued for 30 minutes under hydrogen partial pressure of 3 kg/cm$^2$. To the resulting hydrogenated polymer solution, 2,6-di-tert.butyl-hydroxytoluene as an antioxidant was added in an amount of 0.5 part per part of the polymer, and then the solvents were removed. Now, the hydrogenation of the butadiene polymer was repeated under varied hydrogenation conditions (hydrogenation pressure, hydrogenation temperature, time and amount of catalyst), thereby obtaining hydrogenated polymers. The crystallization peak calorie was controlled through addition of a polar compound, tetrahydrofuran (THF) or control of the polymerization temperature. The crystallization peak calorie could be decreased with increase in the polar compound or by lowering the polymerization temperature. Further, a hydrogenated styrene-butadiene copolymer was obtained in the same manner as mentioned above, except that styrene was added together with butadiene.

Thus, hydrogenated copolymers were obtained as the component (A-1). Characteristic properties of the obtained copolymers referred to as HSBC-1 to HSBC-9 were as shown in Table 1. Incidentally, the obtained copolymer was a random copolymer. Further, in a manner similar to that mentioned above, hydrogenated rubber referred to as HBR and HSBR were obtained as the component (a2), and characteristic properties thereof were as shown in Table 1.

(b) Vulcanizable rubber
1) Ethylene-α-olefin copolymer (a1)
  a) Ethylene-propylene-ethylidenenorbornene (ENB) copolymer (referred to as EOR-1)
  It was produced by a method using a metallocene catalyst as described in JP-A-3-163088. A composition ratio of ethylene/propylene/ENB in the copolymer was 72/24/4 (ratio by weight), and Mooney viscosity thereof was 100.
  b) Ethylene-propylene-ethylidenenorbornene (ENB) copolymer (referred to as EOR-2)
  It was produced by a method using a usual Ziegler catalyst. A composition ratio of ethylene/propylene/ENB in the copolymer was 72/24/4 (ratio by weight), and Mooney viscosity thereof was 105.
  c) Ethylene-octene-1 copolymer (referred to as EOR-3)
  It was produced by a method using a metallocene catalyst as described in JP-A-3-163088. A composition ratio of ethylene/octene-1 in the copolymer was 72/28 (ratio by weight), and Mooney viscosity thereof was 100.
(c) Olefinic resin
  (1) Homopolypropylene
  Isotactic homopolypropylene manufactured by Sun-Allomer Montell SDK Sunrise Ltd (hereinafter referred to as PP).
(d) Vulcanizing agent
  1) Vulcanization initiator (C-1)
  2,5-Dimethyl-2,5-bis(t-butylperoxy)hexane (a commercial name of Perhexa 25B, manufactured by NOF Corporation) (hereinafter referred to as POX)
  2) Polyfunctional monomer (C-2)
  Triallyl isocyanurate (manufactured by Nippon Kasei Chemical Co., Ltd., hereinafter referred to as TAIC)
(e) Paraffin oil (D)
  Diana process oil PW-90 manufactured by Idemitsu Kosan Co., Ltd. (hereinafter referred to as MO)

Examples 1 to 9 and Comparative Examples 1 to 7

Using a twin screw extruder (40 mmφ, L/D=47) having a feeding port at the center of a barrel, and using HSBC-1 to HSBC-9 shown in Table 1 as the component (A-1) and EOR-1 to EOR-3 mentioned above or HBR or HSBR shown in Table 1 as the component (A-2), respective compositions having a weight ratio of (A-1) and/or (A-2)/(B) PP/(C-1) POX/(C-2) TAIC/(D) MO (=total 50/50/0.2/0.4/30) were obtained under the following conditions. As the screw, a double-blade screw having kneading means before and after the feeding port was used.

The thus obtained composition was molded at 200° C. using a T-die extruder, thereby obtaining a sheet having a thickness of 2 mm, and various evaluations were carried out.

The results are as shown in Tables 2 to 4.
(Extrusion conditions)
1) Melt extrusion temperature: 220° C. constant
2) Output Q=12 kg/hr
3) Extruder: inner diameter of barrel=25 mm
4) L/D=47, wherein L is length of the extruder (mm)
5) Screw rotating number N=280 rpm Tables 1 to 4 demonstrate that a rubbery polymer composition superior in its scratch resistance, oil resistance and mechanical strength can be obtained when two kinds of (A-1) and (A-2) which meet requirements of the present invention are used and subjected to vulcanization reaction at the same time.

Figure 2:
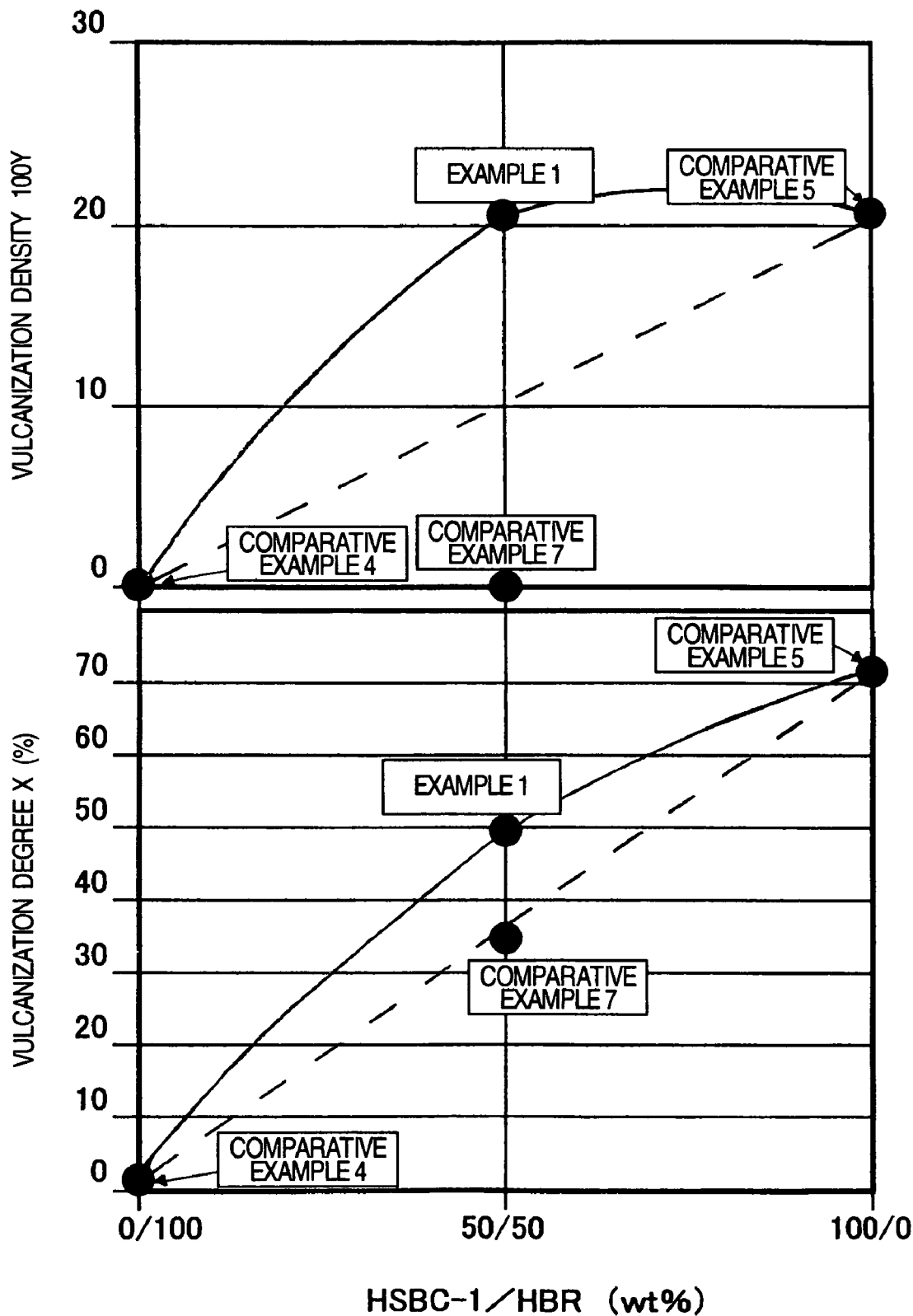
FIG. 2 shows the relation of a vulcanization degree and a vulcanization density in Comparative Example 4, Comparative Example 5, Example 1 and Comparative Example 7.

In Table 3, both the vulcanization degree and the vulcanization density, which are indexes of a rubber structure, are shown in addition to the data obtained in Example 1 and Comparative Examples 4, 5 and 7 as shown in Table 2. Example 1 relates to a composition obtained by using two kind of (A-1) and (A-2) in an equivalent amount and by subjecting them to vulcanization reaction at the same time. Comparative Examples 4 and 5 relate to each composition obtained by subjecting (A-1) alone or (A-2) alone, respectively, to vulcanization reaction. Comparative Example 7 relates to a composition obtained by melt-blending both the composition obtained in Comparative Example 4 and the composition obtained in Comparative Example 5 in an equivalent amount. The results are shown in FIG. 1 and FIG. 2. The (A-2) in Comparative Example 4 showed no vulcanization peak in the melting test using a labo-plastomil, and the vulcanization degree and vulcanization density of the obtained composition were found to be very low. On the other hand, when the above-mentioned two were used and subjected to vulcanization reaction at the same time, there were obtained the vulcanization degree and vulcanization density, which were high to exceed the additivity. Owing to such a high vulcanization degree and vulcanization density, superior tensile strength, scratch resistance and oil resistance can be obtained. Here, it is important that the above-mentioned two are subjected to vulcanization reaction at the same time. In the case where compositions subjected independently to vulcanization reaction are blended with each other (Comparative Example 7), the above-mentioned superior characteristics cannot be obtained.

TABLE 1

| | Name | Butadiene/ styrene weight ratio | Hydrogenation percent (%) | Crystallization peak calorie (J/g) |
|---|---|---|---|---|
| Hydrogenated copolymer (A-1) | HSBC-1 | 30/70 | 95 | 0 |
| | HSBC-2 | 35/65 | 95 | 0 |
| | HSBC-3 | 50/50 | 95 | 0 |
| | HSBC-4 | 80/20 | 95 | 18 |
| | HSBC-5 | 80/20 | 95 | 20 |
| | HSBC-6 | 85/15 | 50 | 0 |
| | HSBC-7 | 85/15 | 85 | 0 |
| | HSBC-8 | 85/15 | 90 | 0 |
| | HSBC-9 | 85/15 | 95 | 0 |
| Hydrogenated rubber(a2) | HBR | 100/0 | 95 | 20 |
| | HSBR | 75/25 | 95 | 10 |

TABLE 2

| | | | Exam. 1 | Exam. 2 | Comp. Exam. 1 | Comp. Exam. 2 | Comp. Exam. 3 | Comp. Exam. 4 | Comp. Exam. 5 | Comp. Exam. 6 | Exam. 3 | Exam. 4 | Comp. Exam. 7 |
|---|---|---|---|---|---|---|---|---|---|---|---|---|---|
| Composi- | A-1 | Name of copolymer | HSBC-1 | HSBC-1 | HSBC-4 | HSBC-5 | — | HSBC-1 | — | — | HSBC-3 | HSBC-3 | |

TABLE 2-continued

|  |  |  |  | Exam. 1 | Exam. 2 | Comp. Exam. 1 | Comp. Exam. 2 | Comp. Exam. 3 | Comp. Exam. 4 | Comp. Exam. 5 | Comp. Exam. 6 | Exam. 3 | Exam. 4 | Comp. Exam. 7 |
|---|---|---|---|---|---|---|---|---|---|---|---|---|---|---|
| tion |  | Content | Part by wt | 25 | 25 | 25 | 50 | 0 | 50 | 0 | 0 | 25 | 25 |  |
|  |  | Hydrogenation percent of butadiene portion | % | 95 | 95 | 95 | 95 | — | 95 | — | — | 95 | 95 | That obtained by blending the composition of Comp. Exam. 4 and the composition of Comp. Exam. 5 in a weight ratio of 50/50. |
|  |  | Butadiene/styrene weight ratio |  | 30/70 | 30/70 | 80/20 | 80/20 | — | 30/70 | — | — | 50/50 | 50/50 |  |
|  |  | ΔH | J/g | 0 | 0 | 18 | 20 | — | 0 | — | — | 0 | 0 |  |
|  | A-2 | Name of a1 rubber |  | — | EOR-1 | — | — | — | — | — | EOR-1 | EOR-2 | EOR-3 |  |
|  |  | Content of a1 | Part by wt | 0 | 25 | 0 | 0 | 0 | 0 | 0 | 50 | 25 | 25 |  |
|  |  | Name of a2 rubber |  | HBR | — | HBR | — | HSBR | — | HBR | — | — | — |  |
|  |  | Content of a2 | Part by wt | 25 | 0 | 25 | 0 | 50 | 0 | 50 | 0 | 0 | 0 |  |
|  |  | Hydrogenation percent of butadiene portion | % | 95 | — | 95 | — | 95 | — | 95 | — | — | — |  |
|  |  | Butadiene/styrene weight ratio |  | 100/0 | — | 100/0 | — | 75/25 | — | 100/0 | — | — | — |  |
|  |  | ΔH | J/g | 20 | — | 25 | — | 10 | — | 20 | — | — | — |  |
|  | B | PP | Part by wt | 50 | 50 | 50 | 50 | 50 | 50 | 50 | 50 | 50 | 50 | 50 |
|  | D | MO | Part by wt | 30 | 30 | 30 | 30 | 30 | 30 | 30 | 30 | 30 | 30 | 30 |
| Physical properties |  | Tensile strength | MPa | 17 | 15 | 20 | 15 | 9 | 5 | 14 | 13 | 13 | 15 | 7 |
|  |  | Scratch resistance Depth of scratch | μm | 8 | 10 | 15 | 19 | 14 | 4 | 25 | 27 | 12 | 11 | 19 |
|  |  | Scratch resistance Visual Judgment |  | ○ | ○ | ○ | ○ | Δ | ○ | Δ | Δ | ○ | ○ | Δ |
|  |  | Oil resistance Weight increasing ratio | % | 18 | 12 | 36 | 47 | 31 | 21 | 44 | 30 | 14 | 15 | 40 |

TABLE 3

|  |  |  |  | Exam. 1 | Comp. Exam. 4 | Comp. Exam. 5 | Comp. Exam. 7 |
|---|---|---|---|---|---|---|---|
| Composition | A-1 | Name of copolymer |  | HSBR-1 | HSBR-1 | — | That obtained by blending the composition of Comp. Exam. 4 and the composition of Comp. Exam. 5 in a weight ratio of 50/50. |
|  |  | Content | Part by wt | 25 | 50 | 0 |  |
|  |  | Hydrogenation percent of butadiene portion | % | 95 | 95 | — |  |
|  |  | Butadiene/styrene weight ratio |  | 30/70 | 30/70 | — |  |
|  |  | ΔH | J/g | 0 | 0 | — |  |
|  | A-2 | Name of a1 rubber |  | — | — | — |  |
|  |  | Content of a1 | Part by wt | 0 | 0 | 0 |  |
|  |  | Name of a2 rubber |  | HBR | — | HBR |  |
|  |  | Content of a2 | Part by wt | 25 | 0 | 50 |  |
|  |  | Hydrogenation percent of butadiene portion | % | 95 | — | 95 |  |
|  |  | Butadiene/styrene weight ratio |  | 100/0 | — | 100/0 |  |
|  |  | ΔH | J/g | 20 | — | 20 |  |

TABLE 3-continued

|  |  |  |  | Exam. 1 | Comp. Exam. 4 | Comp. Exam. 5 | Comp. Exam. 7 |
|---|---|---|---|---|---|---|---|
|  | B | PP | Part by wt | 50 | 50 | 50 | 50 |
|  | D | MO | Part by wt | 30 | 30 | 30 | 30 |
|  | Vulcanization | Vulcanization degree X | % | 49 | 2 | 72 | 35 |
|  |  | Vulcanization density 100Y | — | 21 | 0 | 21 | 0 |
| Physical properties |  | Tensile strength | MPa | 17 | 5 | 14 | 7 |
|  |  | Scratch resistance Depth of scratch | μm | 8 | 4 | 25 | 19 |
|  |  | Scratch resistance Visual Judgment |  | ○ | ○ | Δ | Δ |
|  |  | Oil resistance Weight increasing ratio | % | 18 | 21 | 44 | 40 |

TABLE 4

|  |  |  |  | Exam. 5 | Exam. 6 | Exam. 7 | Exam. 8 | Exam. 9 |
|---|---|---|---|---|---|---|---|---|
| Composition | A-1 | Name of copolymer |  | HSBC-6 | HSBC-7 | HSBC-8 | HSBC-9 | HSBC-2 |
|  |  | Content | Part by wt | 25 | 25 | 25 | 25 | 25 |
|  |  | Hydrogenation percent of butadiene portion | % | 50 | 85 | 90 | 95 | 95 |
|  |  | Butadiene/styrene weight ratio |  | 85/15 | 85/15 | 85/15 | 85/15 | 35/65 |
|  |  | ΔH | J/g | 0 | 0 | 0 | 0 | 0 |
|  | A-2 | Name of a1 rubber |  | EOR-1 | EOR-1 | EOR-1 | EOR-1 | EOR-1 |
|  |  | Content of a1 | Part by wt | 25 | 25 | 25 | 25 | 25 |
|  |  | Name of a2 rubber |  | — | — | — | — | — |
|  |  | Content of a2 | Part by wt | 0 | 0 | 0 | 0 | 0 |
|  |  | Hydrogenation percent of butadiene portion | % | — | — | — | — | — |
|  |  | Butadiene/styrene weight ratio |  | — | — | — | — | — |
|  |  | ΔH | J/g | — | — | — | — | — |
|  | B | PP | Part by wt | 50 | 50 | 50 | 50 | 50 |
|  | D | MO | Part by wt | 30 | 30 | 30 | 30 | 30 |
| Physical properties |  | Tensile strength | MPa | 10 | 13 | 14 | 14 | 16 |
|  |  | Scratch resistance Depth of scratch | μm | 13 | 11 | 9 | 8 | 9 |
|  |  | Scratch resistance Visual Judgment |  | Δ | ○ | ○ | ○ | ○ |
|  |  | Oil resistance Weight increasing ratio | % | 10 | 12 | 13 | 14 | 11 |

What is claimed is:

1. A vulcanized rubbery polymer composition comprising a component (A) and a thermoplastic resin (B), wherein the component (A) comprises a hydrogenated copolymer (A-1), which is obtained by hydrogenating a copolymer comprising a conjugated diene monomer unit and an aromatic vinyl monomer unit and having an aromatic vinyl monomer content of not less than 5% by weight and not more than 90% by weight, and which has a crystallization peak calorie measured by a differential scan calorimetry of not more than 2 J/g, and at least one vulcanizable rubber (A-2) selected from the group consisting of a copolymer (a1) comprising an ethylene unit and an α-olefin unit of 3 to 20 carbon atoms and a hydrogenated rubber (a2) obtained from a homopolymer rubber of at least one conjugated diene monomer or a copolymer rubber comprising a conjugated diene monomer unit and an aromatic vinyl monomer unit and having an aromatic vinyl monomer content of less than 5% by weight.

2. The rubbery polymer composition according to claim 1, wherein the foregoing (a1) is a copolymer obtained by using a metallocene catalyst.

3. The rubbery polymer composition according to claim 1 or 2, wherein the foregoing hydrogenated copolymer (A-1) is the one hydrogenated to the extent that not less than 50% of the whole olefinic double bond is hydrogenated or a remaining double bond of the side chain is not more than 5%.

4. The rubbery polymer composition according to claim 1, wherein the aromatic vinyl monomer content in the foregoing (A-1) is from 50 to 90% by weight.

5. The rubbery polymer composition according to claim 1, wherein the foregoing (A-1) has a portion of the aromatic vinyl monomer which is randomly bonded.

6. The rubbery polymer composition according to claim 1, wherein the foregoing (B) is a propylene resin.

7. The rubbery polymer composition according to claim 1, wherein the foregoing (B) comprises a propylene random copolymer resin which has a flexural modulus of elasticity prescribed in JIS K6758 of from 10 to 1000 MPa and which comprises propylene as the main constituent and an α-olefin having 2 carbon atoms and/or an α-olefin having 4 to 20 carbon atoms.

8. The rubbery polymer composition according to claim 6, wherein the foregoing (B) is a propylene resin obtained by using a metallocene catalyst.

9. The rubbery polymer composition according to claim 1, which is a vulcanized one obtained by melt-kneading a mixture containing the hydrogenated copolymer (A-1), the vulcanizable rubber (A-2) and the thermoplastic resin (B) in the presence of a vulcanizing agent.

10. The rubbery polymer composition according to claim 1, which further contains a softening agent (D).

* * * * *